United States Patent [19]

Tokoro et al.

[11] Patent Number: 5,734,446
[45] Date of Patent: Mar. 31, 1998

[54] VIDEO SIGNAL PROCESSING APPARATUS AND PICTURE ADJUSTING METHOD

[75] Inventors: Tomio Tokoro; Masaaki Mitani, both of Tokyo, Japan

[73] Assignee: Sony Corporation, Tokyo, Japan

[21] Appl. No.: 634,205

[22] Filed: Apr. 18, 1996

[30] Foreign Application Priority Data

Apr. 21, 1995 [JP] Japan .................... 7-119049

[51] Int. Cl.$^6$ .................................................. H04N 3/22
[52] U.S. Cl. .................... 348/745; 348/383; 348/511; 348/588
[58] Field of Search .................... 348/383, 554, 348/555, 745, 746, 747, 806, 807, 501, 511, 584, 586, 588, 598, 599; H04N 3/22

[56] References Cited

U.S. PATENT DOCUMENTS

| | | | |
|---|---|---|---|
| 4,870,329 | 9/1989 | Ara | 315/367 |
| 4,977,446 | 12/1990 | Shiomi et al. | 348/747 |
| 5,144,418 | 9/1992 | Brown et al. | 348/747 |
| 5,365,278 | 11/1994 | Willis | 348/588 |
| 5,459,477 | 10/1995 | Fukuda et al. | 345/130 |
| 5,592,240 | 1/1997 | Sakamoto et al. | 348/807 |

FOREIGN PATENT DOCUMENTS

WO-A-92 08319 5/1992 WIPO ...................... H04N 7/00

Primary Examiner—John K. Teng
Assistant Examiner—Jeffrey S. Murrell
Attorney, Agent, or Firm—Frommer Lawrence & Haug LLP; William S. Frommer

[57] ABSTRACT

When the input horizontal synchronizing frequency is changed, if the backup data (luminance correction data) corresponding to the horizontal synchronizing frequency is stored in the backup memory unit, then the backup data stored in the backup memory unit is read out from the backup memory unit and then stored in a correction memory unit. If in the above case the backup data corresponding to the changed horizontal synchronizing frequency is not stored in the backup memory unit, a backup data corresponding to the changed horizontal synchronizing frequency is calculated by the correction data calculating unit and the calculated correction data is stored in the correction memory unit and the backup memory unit. When the synthesized picture is projected by using the video signal source 20 which is frequently used, it is possible to quickly carry out various adjustments for the SEM processing.

3 Claims, 8 Drawing Sheets

VIDEO SIGNAL PROCESSING APPARATUS AND PICTURE ADJUSTING METHOD

BACKGROUND OF THE INVENTION

1. Field of the Invention

The present invention relates to a video signal processing apparatus, and more particularly to a video signal processing apparatus and a picture adjusting method which are useful when a large-size picture is formed by synthesizing two video signals or more.

2. Description of the Related Art

A display apparatus, such as a television receiver, a monitor apparatus of a computer or the like, for displaying a picture on a tube surface of a cathode-ray tube, a liquid crystal display or the like has been usually used to visually display various kinds of informations. However, a limited size of a display screen of such display apparats permits a user to watch only a part of a picture which he really wants to watch.

On the other hand, while a projector employing a projecting tube or a liquid crystal plate can reproduce a picture on a large part of eyesight by projecting the picture on a large-size screen, it is generally difficult for such large-size projecting apparatus to reproduce a bright picture as its display screen is larger.

Therefore, a so-called multi-vision type picture projecting apparatus for synthesizing pictures projected by small-size projecting apparatus to project a synthesized picture on a large-size screen is used to reproduce a picture used for producing virtual reality.

Figure 1:
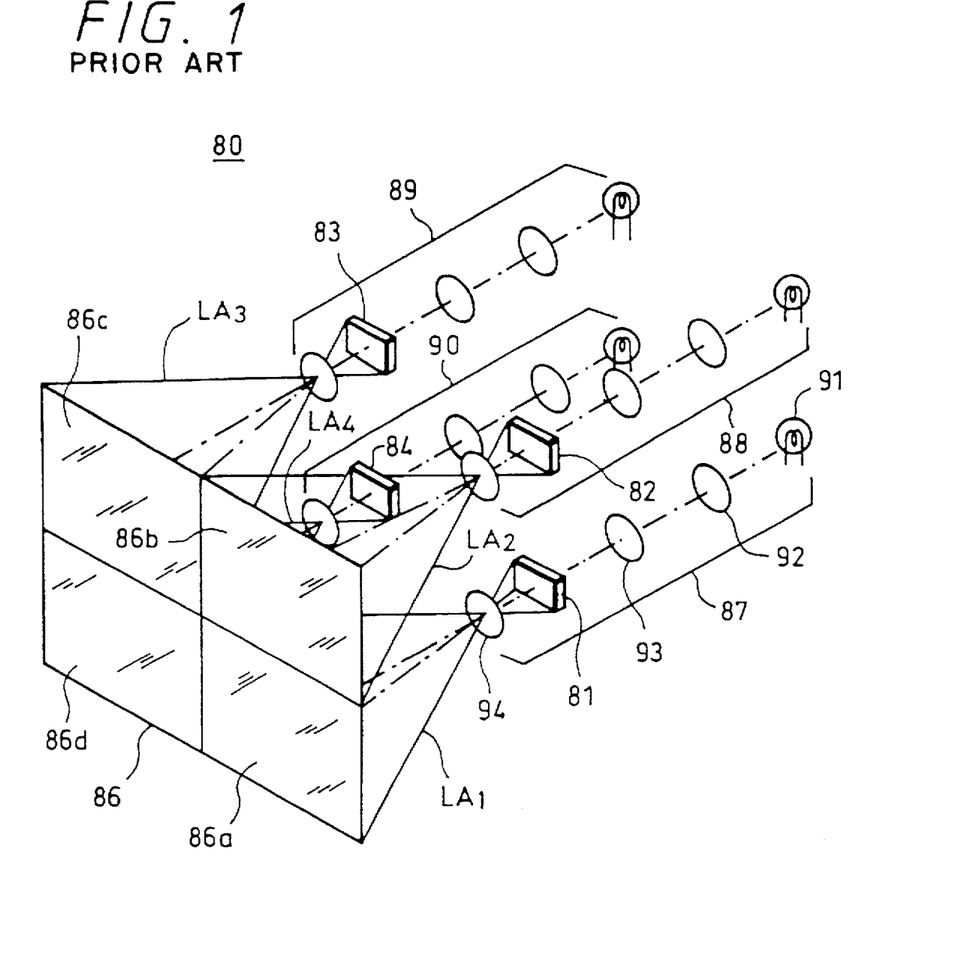
FIG. 1 is a diagram showing an apparatus for projecting a synthesized picture on a screen.

FIG. 1 schematically shows a projecting apparatus in which a plurality of small-size projecting apparatus (liquid crystal projectors) are disposed to form a large-size synthesized picture on a screen. Reference numeral 80 depicts the whole synthesized-picture display apparatus.

A transmission type screen 86 is divided into four screen portions 86a to 86d. Liquid crystal plates 81 to 84 are provided so as to correspond to the respective screen portions 86a to 86d. Rays of light are radiated on the liquid crystal plate 81 to 84, thereby pictures $LA_1$ to $LA_4$ being projected on the screen 86.

Optical systems 87 to 90 each have the same arrangement. The optical system 87, for example, includes a light source 91, a condenser lens 92, a relay lens 93 and a field lens 94. Rays of light emitted from the light source 91 are condensed by the condenser lens 92 and the relay lens 93 onto the liquid crystal plate 81. The liquid crystal plate 81 is energized in response to a supplied video signal to thereby modulate the transmission light therethrough. The transmitted light thus modulated is projected through the field lens 94 onto the screen 86a.

Similarly, in each of other optical systems 88, 89 and 90, rays of light which represent a picture and are transmitted through liquid crystal plates 82, 83 and 84 are respectively projected on quartered regions 86b, 86c, 86d of the screen 86. Therefore, a synthesized picture is formed on the screen 86, which can provide a large-size picture display apparatus.

However, such projection-type synthesized-picture projecting apparatus produces a discontinuous line of the picture at a portion where each of the projected picture is adjacent to another projected picture. It is very difficult to position the respective optical systems 87 to 90 for removing such discontinuous lines.

Figure 2A:
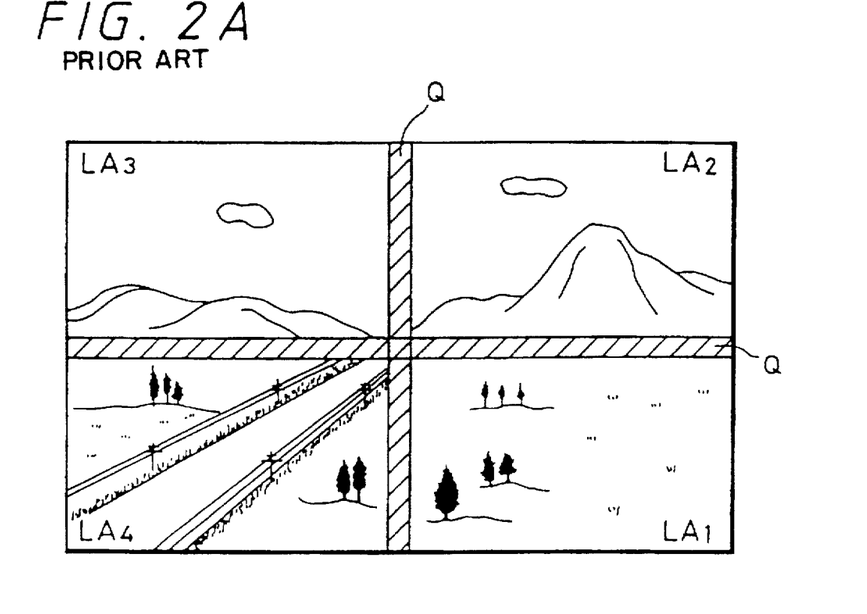
FIG. 2A is diagram showing an overlapped portion of edge portions of quartered synthesized pictures.
Figure 2B:
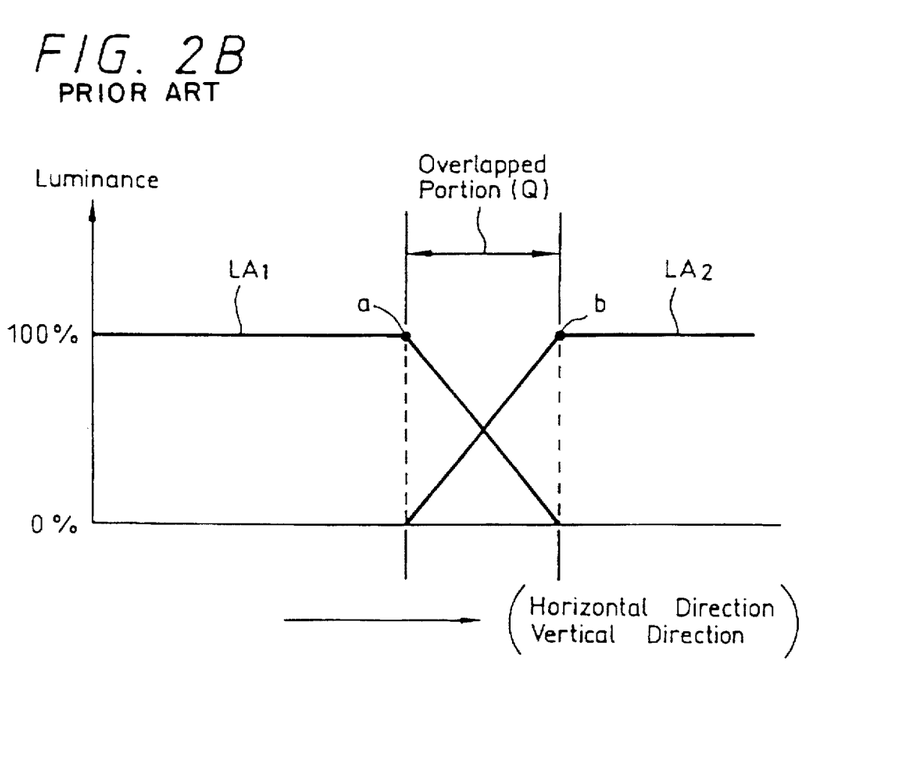
FIG. 2B is a diagram showing a correction characteristic of a video signal.

For this end, as shown in FIG. 2A, the above projecting apparatus projects the picture on the screen so that boundaries between adjacent picture portions $LA_1$ to $LA_4$ to be synthesized on the screen 86 should be overlapped to prevent a synthesized picture projected on the screen 86 from having any clearance therein. Further, the above projecting apparatus adjusts a luminance level of one of video signals for pictures projected on an overlapped region Q. FIG. 2B schematically shows respective luminance levels at the picture portions $LA_1$ and $LA_2$, for example. The projecting apparatus carries out a signal processing so that, as shown in FIG. 2B, a luminance level at the picture portion $LA_1$ should be gently lowered from a point a and a luminance level at the picture portion $LA_2$ should be gently increased toward a point b from its rising point.

Recently, apparatus, such as a television receiver, a personal computer and so on, for scanning a picture with different synchronization informations (horizontal and vertical synchronizing signals) has been increased. Since the above apparatus corresponds to a multi scan input, the above apparatus can display a picture supplied from each of the apparatus.

While the above picture projecting apparatus also corresponds to the multi-scan input and can project the pictures with different synchronization informations, it must carry out the signal processing for correcting a luminance signal level as shown in FIG. 2B. When correction data is calculated in this case, the correction data must be subjected to a predetermined calculation in response to a frequency of an input horizontal synchronizing signal, for obtaining an optimum correction data with respect to the frequency of the horizontal synchronizing signal.

Accordingly, every time when a plurality of video-signal sources having different synchronization informations are switched and used, the correction data must be calculated.

SUMMARY OF THE INVENTION

In view of such aspects, it is an object of the present invention to provide a video signal processing apparatus and a picture adjusting method which simplify a signal processing required when two video signals or more are synthesized to project a synthesized picture on a screen.

According to a first aspect of the present invention, a video signal processing apparatus includes a synchronizing signal separation unit for extracting a synchronization information of an input video signal, a frequency measuring unit for detecting a horizontal synchronizing frequency of an input video signal from the synchronization information, a memory unit for storing a correction data used for correcting at least a video signal of One horizontal scanning line amount corresponding to the horizontal synchronizing frequency, a backup memory unit for storing the correction data corresponding to the horizontal synchronizing frequency of the input video signal, and a correction data calculating unit for calculating a correction data corresponding to the horizontal synchronizing frequency. When the frequency of the input horizontal synchronizing signal is changed from a previous frequency, if a correction data corresponding to the horizontal synchronizing frequency is stored in the backup memory unit, then the correction data is read out from the backup memory unit and stored in the memory unit. If a correction data corresponding to the frequency of the input horizontal synchronizing signal is not stored in the backup memory unit in the above case, then the correction data calculated by the correction data calculating unit is stored in the memory unit and the backup memory unit.

The backup memory unit can store a plurality of correction data for backup corresponding to a plurality of horizontal synchronizing frequencies.

According to a second aspect of the present invention, in the video signal processing apparatus of a synthesized picture projecting apparatus which includes the above video signal processing apparatus and projects two pictures or more on a screen to form a synthesized picture, when the horizontal synchronizing frequency is changed, if the correction data corresponding to the horizontal synchronizing frequency is stored as a backup data in the backup memory unit, then the correction data stored in the backup memory unit is read out from the backup memory unit and then stored in a correction memory unit. If in the above case the backup data corresponding to the changed horizontal synchronizing frequency is not stored in the backup memory unit, a correction data corresponding to the horizontal synchronizing frequency is calculated to store the calculated correction data in the correction memory unit and the backup memory unit. The video signal processing apparatus of the synthesized picture projecting apparatus adjusts the picture based on the correction data stored in the correction memory unit.

DESCRIPTION OF THE PREFERRED EMBODIMENT

An outline of a synthesized-picture projecting apparatus to which the present invention is applied will be described with reference to FIG. 3.

Figure 3:
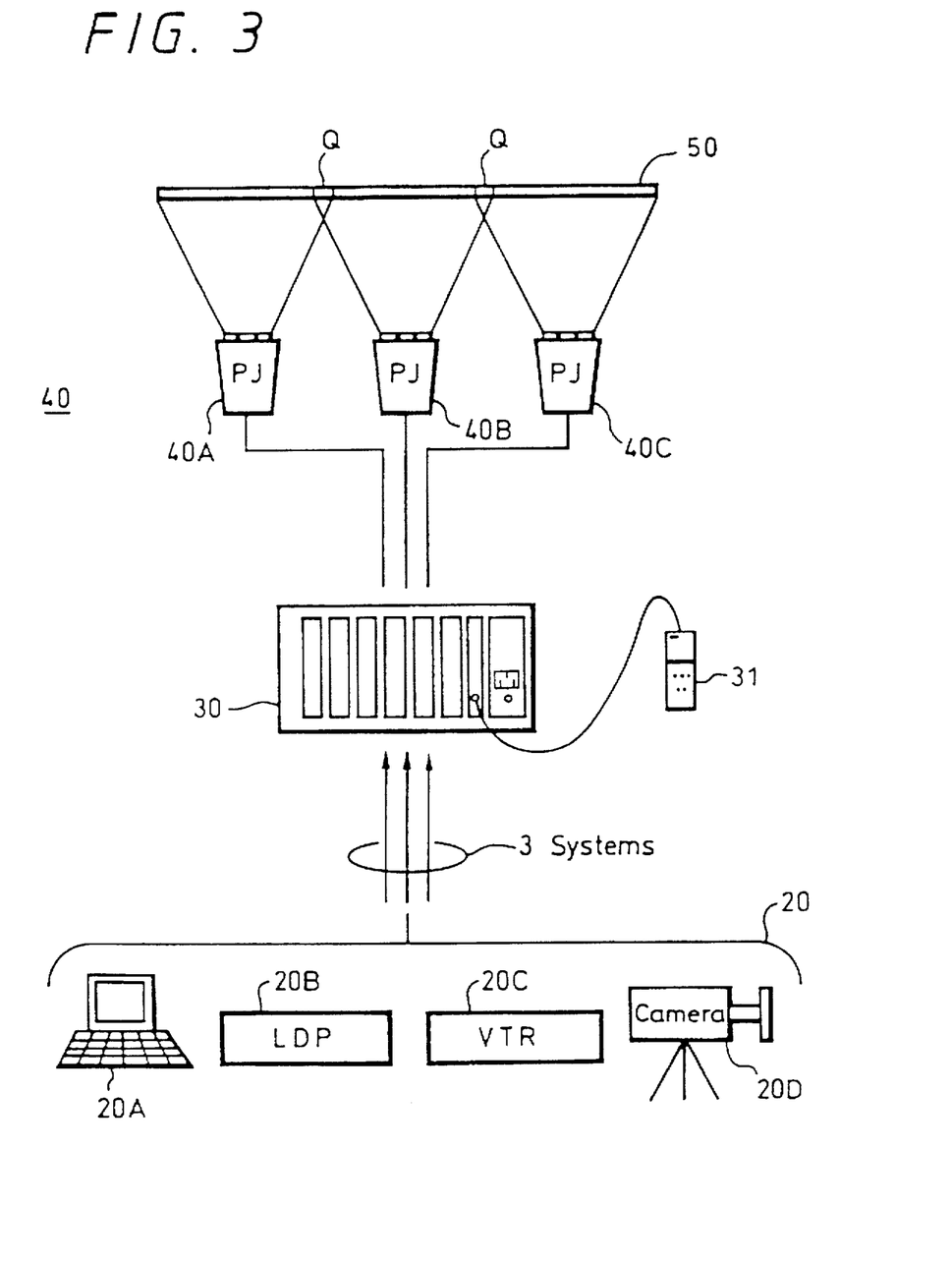
FIG. 3 is a schematic diagram showing a synthesized-picture projecting apparatus according to an embodiment of the present invention in a used mode.

As shown in FIG. 3, a video signal source (multi-screen signal source) 20 used for displaying a synthesized picture includes a computer 20A, a laser disk player (LDP) apparatus 20B, a video tape recorder (VTR) 20C and a video camera 20D or the like, for example. The picture signal source 20 outputs, for example, a pictorial information from the computer 20A, a multi-picture data from the laser disk apparatus 20B, a reproduced video signal from the VTR 20C, a video signal obtained by picking up an image of an object and output directly from the video camera 20D, etc. as video sources.

A single video signal output from the VTR 20C, the laser disk player apparatus 20B or the like is once stored in the computer 20A as a picture data. The computer 20A processes the video signal to obtain a plurality of video signals for multi screens, and outputs them as R, G, B component signals. In this case, synchronization information may be superposed on a G component signal, for example, or the synchronization information may be derived through a dedicated cable as another signal.

The multi-screen video signal output from the video signal source 20 is preferably supplied as the R, G, B component signals to a soft edge matching apparatus 30 (hereinafter referred to as an SEM apparatus) forming the signal processing apparatus according to the present invention. The SEM apparatus 30 carries out the above signal processing which, when a synthesized picture is projected as described above, makes pictures continuous at a joint portion thereof. Then, the SEM apparatus 30 supplies the signals to three projecting apparatus 40A, 40B, 40C of a synthesized-picture projecting apparatus 40 for respectively projecting pictures on left side of the screen 50, at the center thereof and on the right side thereof.

When a user operates various operation keys provided in a remote controller unit 31 connected to the SEM apparatus 30, the SEM apparatus 30 carries out the above signal processing in accordance with a command from the remote controller unit 31. The remote controller unit 31 will be described in detail with reference to FIG. 6.

The three projecting apparatus 40A, 40B, 40C of the synthesized-picture projecting apparatus 40 have high-luminance cathode-ray tubes (CRTs) which have been employed as projectors and which convert the video signals into projected pictures to be projected, thereby the synthesized picture being projected on the rectangular screen 50. The projecting apparatus 40A, 40B, 40C may be formed of liquid crystal projectors.

While in this embodiment the three projecting apparatus 40A, 40B, 40C are disposed in the horizontal direction, the present invention is not limited thereto and the signal processing apparatus according to the present invention can be applied to a synthesized-picture projecting apparatus having two projecting apparatus or more. The following embodiment will be described on the assumption that a joint portion in a synthesized picture is processed by using two pictures.

Figure 4:
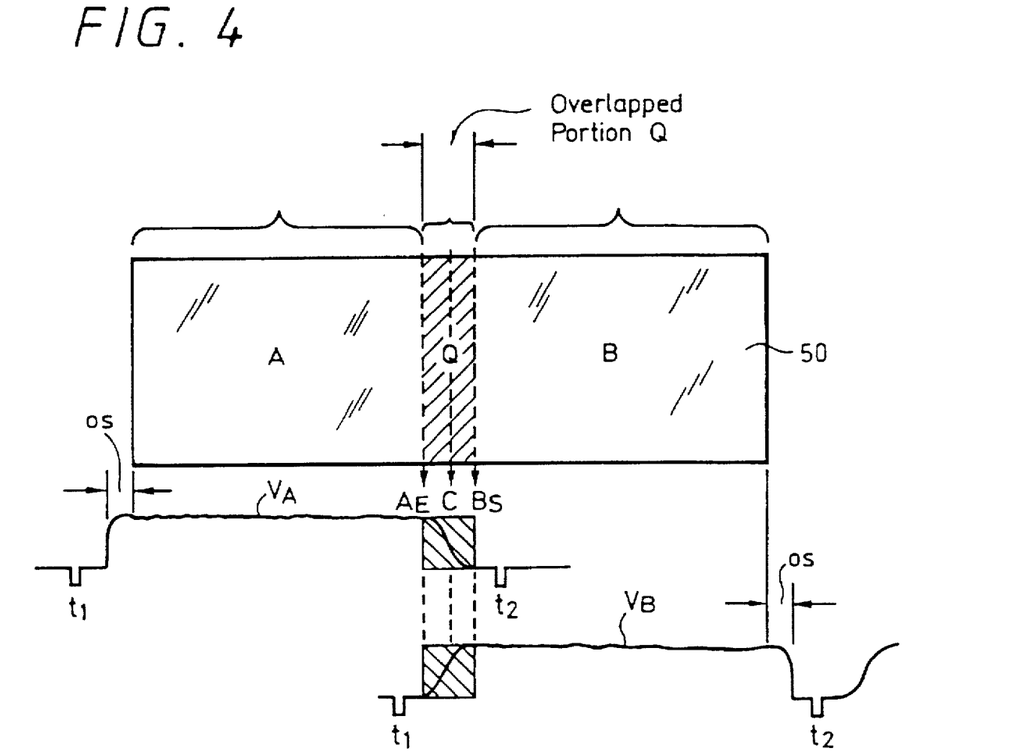
FIG. 4 is a diagram used to explain a synthesized picture projected on a screen.

FIG. 4 is a diagram used to explain a synthesized picture which is obtained by synthesis of two pictures A, B and is to be displayed. FIG. 4 shows how to synthesize the two pictures A, B projected on the screen 50 which has a long length in the horizontal direction.

Edge or boundary portions of the pictures A, B are made as overlapped portions Q where the two pictures are overlapped each other. The signal is processed on the video signal source 20 side so that the overlapped portions Q of the picture A and the picture B should be the same picture. Specifically, as shown in FIG. 4, a signal in a hatched portion of a video signal $V_A$ slanting down to the right from a correction start point $A_E$ and a signal in a hatched portion of a video signal $V_B$ rising up to the right and to a correction end point $B_S$ have the picture informations having the same contents. The video signals $V_A$ and $V_B$ are respectively processed so as to have fade-out and fade-in characteristics in which luminance levels of these portions between the correction start point $A_E$ and the correction end point $B_S$ are gradually lowered and increased as shown by curves in FIG. 4.

Accordingly, when the SME apparatus 30 carries out such signal processing and the two projecting apparatus 40A, 40B, for example, project pictures on the screen 50, the luminance at the overlapped portion Q on the screen 50 is set same as that of the picture A and that of the picture B. Therefore, both of the pictures A, B can be synthesized so that a viewer can seldom notice a boundary portion between the pictures A and B.

If the video signal $V_A$ and the video signal $V_B$ are processed so that a left edge of the video signal $V_A$ and a right edge of the video signal $V_B$ should be set as overscanning portions OS, edges of the pictures A, B can be prevented from being displayed at both ends of the screen 50, respectively.

Figure 5:
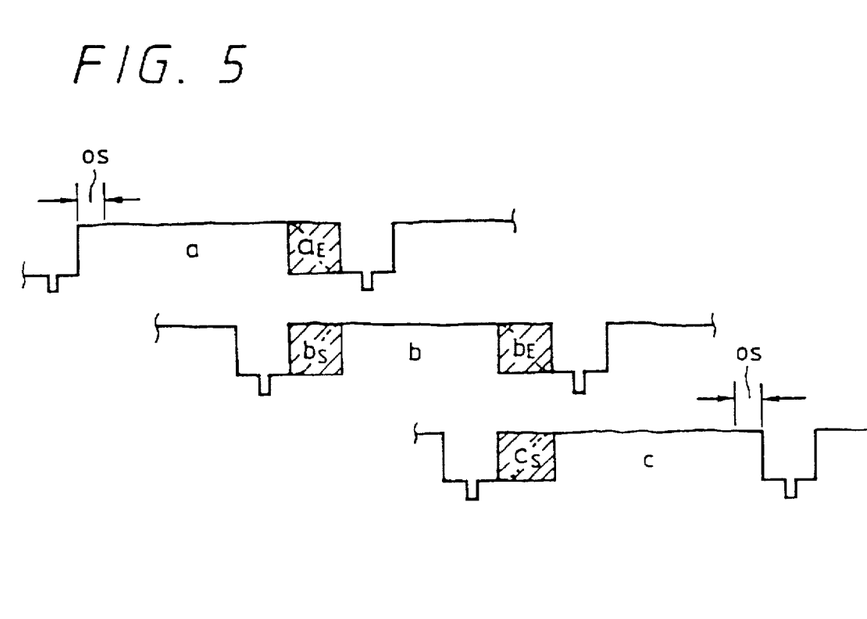
FIG. 5 is a diagram showing a signal waveform used when video signals of three systems are synthesized.

When a synthesized picture is displayed by the three projecting apparatus 40A, 40B, 40C, as shown in FIG. 5, respective video signals a, c (FIG. 5 shows only one horizontal period from $t_1$ to $t_2$ of each of the video signals) for left and right pictures are processed similarly to the video signals $V_A$ and $V_B$ shown in FIG. 4. However, a video signal b for a center picture is processed so that an end portion $a_E$ of the video signal a and a start portion $b_S$ of the video signal b should have the same contents. Further, the video signal b is processed so that an end portion $b_E$ of the video signal b and a start portion $c_S$ of the video signal c should have the same contents.

These portions of the video signals a, b, c are subjected to a fade-out processing and a fade-in processing. Thus, the edge portions of the projected pictures are corrected at two boundary portions generated at when the synthesized picture is obtained by synthesizing three pictures are corrected.

Functions of various operation keys provided in the remote controller unit 31 will be described with reference to FIG. 6.

The remote controller unit 31 is a remote commander used to adjust a width of the overlapped portion Q, positions of the correction start point $A_E$ and the correction end point $B_S$ and so on shown in FIG. 4 when the three-system video signals are synthesized to form a large-size picture. Various commands input by the remote controller unit 31 are input through a dedicated connection cable to the SEM apparatus 30.

The remote controller unit 31 is provided with the operation keys such as a picture selection key group 32, an SEM selection key group 33, movement-direction selection keys L, R, and so on. Near respective operation keys of the picture selection key group 32 and the SEM selection key group 33, selection indicators i are provided, and each of the selection indicators i is turned on while the operation key disposed adjacent thereto is selected.

While the picture selection key group 32 includes three picture selection keys 32a, 32b, 32c for the left, center and right pictures shown in FIG. 3, the picture selection keys are practically provided so as to correspond to the number of the pictures to be displayed.

The picture selection keys 32a, 32b, 32c are used to select the pictures to be subjected to the above various adjustments. When the picture selection key 32a, for example, is selected, the left picture to be projected by the projecting apparatus 40A shown in FIG. 3 is selected. Similarly, when the picture selection keys 32b, 32c are selected, the center picture and the right picture are selected, respectively.

The SEM selection key group 33 includes operation keys for selecting the SEM processing, i.e., a start-point selection key 33a, an SEM selection key 33b, and an end-point selection key 33c. When the start-point selection key 33a is operated, a mode is changed to a mode for adjusting the position of the correction start point $A_E$ of the SEM processing shown in FIG. 4. When the SEM selection key 33b is operated, the mode is changed to a mode for adjusting inclinations of the luminance levels of the video signals $V_A$, $V_B$ at the overlapped portion Q. When the end-point selection key 33c is operated, the mode is changed to a mode for adjusting the position of the correction end point $B_S$ of the SEM processing.

The movement-direction selection keys L, R are used to execute the adjustment selected by using the SEM selection key group 33. For example, with use of these movement-direction selection keys L, R, the positions of the correction start point $A_E$ and the correction end point $B_S$ of the SEM processing are moved in the left and right direction and the inclination of the luminance levels of the video signals $V_A$, $V_B$ at the overlapped portion Q becomes sharp and slow.

The above adjustment will be described by way of example on the assumption that the pictures A and B shown in FIG. 4 are respectively left and right pictures.

After the picture selection key 32a is operated to select the picture A, the start-point selection key 33a is operated to select adjustment of the correction start point $A_E$. When the movement-direction selection key L is operated, the correction start point $A_E$ is shifted toward the left side, and when the movement-direction selection key R is operated, the correction start point $A_E$ is shifted toward the right side. During this adjustment, the inclination of the luminance level at the right end of the video signal $V_A$ is not changed and hence shifted in parallel.

Subsequently, the picture selection key 32c is operated to select the picture B. Through the similar operation, the correction end point $B_S$ of the picture B is shifted to the left or right side. Thus, the width of the overlapped portion Q between the correction start point $A_E$ and the correction end point $B_S$ is adjusted.

When the width of the overlapped portion Q is changed, for example, the SEM selection key 33b is selected to adjust the inclinations of the luminance levels of the video signals $V_A$, $V_B$ at the overlapped portion Q.

In this case, the inclinations are adjusted so that the correction start point $A_E$ of the video signal $V_A$ and the correction end point $B_S$ of the video signal $V_B$ should be a rising point of the video signal $V_B$ and a falling point of the video signal $V_A$, respectively. Specifically, if the width of the overlapped portion Q (a width of a portion where the pictures A, B are overlapped each other) is narrow, then the inclinations are sharp curves. If the width is wide, then the inclinations are slow curves.

Figure 7:
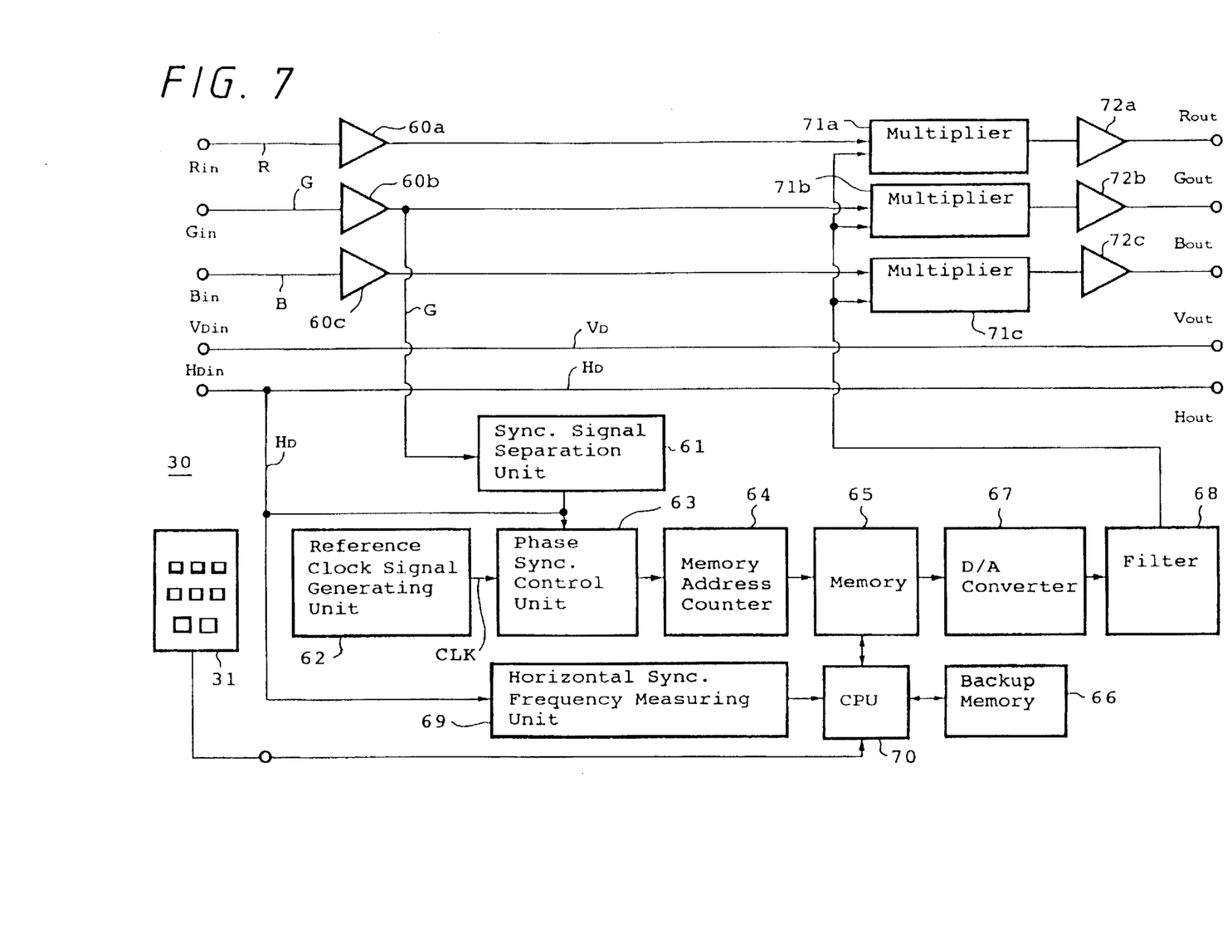
FIG. 7 is a diagram showing a part of a circuit block of the SEM apparatus according to the embodiment.

FIG. 7 is a diagram showing a part of a circuit block of the SEM apparatus 30 for processing the signal corresponding to the overlapped portion Q.

While FIG. 7 shows a circuit block for only one-system video signal which is a circuit block of one of the projecting apparatus 40A, 40B, 40C of the synthesized-picture projecting apparatus 40 shown in FIG. 3, a plurality of input/output systems are practically provided so as to correspond to the number of the provided projecting apparatus.

Video signal input terminals $R_{in}$, $G_{in}$, $B_{in}$ are supplied with video signals from the video source of the video signal source 20 (e.g., the computer 20A, the laser disk player apparatus 20B, etc.).

Respective video signals R, G, B which are input from the video signal input terminals $R_{in}$, $G_{in}$, $B_{in}$ and correspond to red, green and blue are clamped by buffer amplifiers 60a, 60b and 60c. Multipliers 71a, 71b, 71c described later on adjust luminance levels of the clamped video signals R, G, B which are then output to video signal output terminals $R_{out}$, $G_{out}$, $B_{out}$, respectively.

The respective video signals R, G, B output from the video signal output terminals $R_{out}$, $G_{out}$, $B_{out}$ are supplied to the projecting apparatus 40A, 40B, 40C which are not shown in FIG. 7.

A horizontal synchronizing signal input terminal $H_{Din}$, and a vertical synchronizing signal input terminal $V_{Din}$ are terminals to which horizontal and vertical synchronizing signals $H_D$ and $V_D$ that have been separated from the video signals are input as it is carried out in a field of computer graphics or the like. The vertical synchronizing signal $V_D$ input thereto is output from a vertical synchronizing signal output terminal $V_{Dout}$ as it is. The horizontal synchronizing signal $H_D$ is output from a horizontal synchronizing signal output terminal $H_{Dout}$ and also supplied to a phase synchronization control unit 63.

If the synchronizing signals are superposed on the video signal G input from the video input terminal $G_{in}$, then a synchronizing signal separation unit 61 is supplied with the video signal G and extracts the horizontal and vertical synchronizing signals therefrom.

The synchronizing signal separation unit 61 extracts the supplied horizontal synchronizing signal superposed on the video signal G, for example, therefrom and supplies the extracted horizontal synchronizing signal to a phase synchronization control unit 63 (manufactured by Krayus Co. under the tradename of KS6369) and a horizontal synchronizing frequency measuring unit 69 which will be described later on.

A reference clock generating unit 62 is formed of a crystal oscillator or the like and outputs a clock signal CLK having a fixed frequency of 40 MHz regardless of the input synchronizing signals.

The phase synchronization control unit 63 is input with the horizontal synchronizing signal $H_D$ supplied from the horizontal synchronizing signal input terminal $H_{Din}$ or the synchronizing signal separation unit 61 and locks a phase of the clock signal CLK of 40 MHz supplied from the reference clock signal generating unit 62 with reference to the input horizontal synchronizing signal $H_D$. This phase locking prevents a correction jitter of an output picture (in this case, a phase of a pulse of the clock signal CLK is irregularly fluctuated relative to the horizontal synchronizing signal $H_D$, which results in fluctuation in luminance of the output picture).

Since an accuracy of the clock signal CLK directly influences a quality of the output picture, the reference clock signal generating unit 62 is preferably formed of the crystal oscillator or the like which is superior in both accuracy and stability as compared with a phase lock loop (PLL) circuit. The reference clock signal generating unit 62 which can realize such requirement can be formed of a transistor-transistor logic (TLL) crystal oscillator or the like.

An address counter 64 is a counter used for reading out data stored in a memory (RAM) 65 provided at the succeeding stage based on the clock signal CLK supplied from the phase synchronization control unit 63. The address counter 64 is used to read out correction data of one horizontal period from the memory 65 based on 12-bit address data.

Figure 8A:
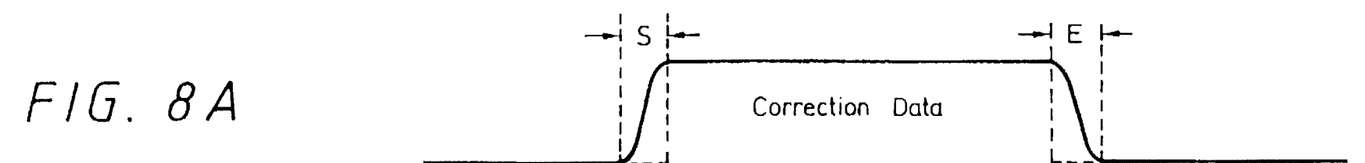
FIGS. 8A and 8B are schematic diagrams showing rising and falling portions of a correction data.
Figure 8B:
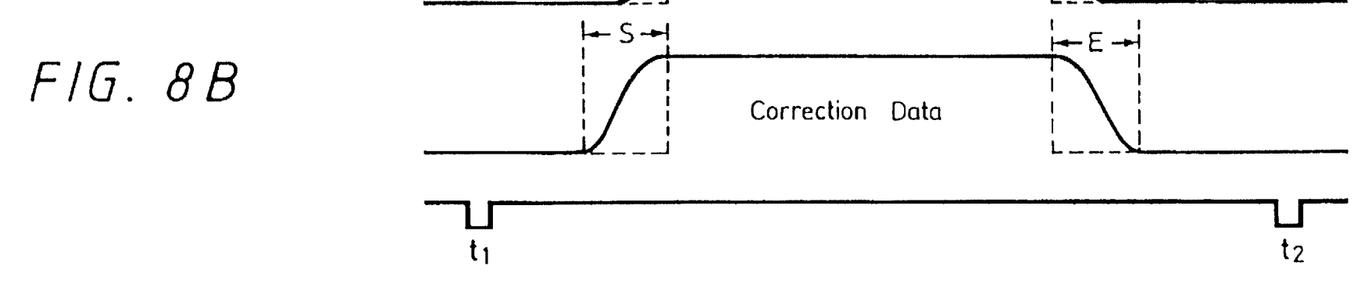

The memory 65 stores correction data which is previously set by a central processing unit (CPU) 70 and used to process the video signal corresponding to the overlapped portion Q, i.e., correction data for permitting the luminance level of the video signal to gradually rise at a correction start region S like cosine curve and to gradually fall at a correction end region E like a cosine curve as shown in FIGS. 8A and 8B.

The memory 65 outputs the correction data during a period corresponding to the overlapped portion Q shown in FIG. 4 (a period between the correction start point $A_E$ and the correction end point $B_S$). While in this embodiment the above correction data is an 8-bit data and a read cycle is set to 25 ns, these values can be changed in view of a storage capacity and a price of the memory.

In this embodiment, since the frequency of the reference clock signal is fixed (i.e., 40 MHz), the read cycle is constant regardless of the horizontal frequency of the input video signal. Therefore, a D/A converter 67 and a filter (a smoothing filter with a cut-off frequency of 20 MHz) 68 provided at the succeeding stage can have a certain characteristic regardless of the horizontal frequency of the input video signal, which leads to simplification of the signal processing circuit.

When the video signal having the horizontal frequency of, for example, 15 KHz is input to the SEM apparatus 30, the video signal is processed with the correction data having the sampling number of about 2667 in one horizontal period. When the video signal having the horizontal frequency of, for example, 93 KHz is input thereto, the video signal is processed with the correction data having the sampling number of about 431 in one horizontal period. Accordingly, in this embodiment, the SEM apparatus 30 includes a detection unit for detecting the horizontal frequency of the input video signal, i.e., the horizontal synchronizing frequency measuring unit 69. When the video signals of different systems are synthesized to project the synthesized picture, contents of the correction data (stored address) stored in the memory 65 are changed in accordance with the horizontal frequency of the input video signal detected by the horizontal synchronizing frequency measuring unit 69. The correction data is always read out from the memory 65 in a constant cycle and supplied to the multipliers 71a, 71b, 71c. The multipliers 71a, 71b, 71c process portions of the video signals corresponding to the overlapped portion Q with the supplied correction data.

A backup memory 66 stores several kinds of optimum correction data which have been set for various video signals. The backup memory 66 is formed of eight event memories, for example. When, for example, the video signals of different sources are synthesized to display a synthesized picture, if the horizontal frequency of the video signal has already been detected and data set for the synthesized picture in response to the frequency has already been stored in the backup memory 66, then the horizontal synchronizing frequency measuring unit 69 generates an interruption directly to the CPU 70. The CPU 70 reads out an optimum data used when the synthesized picture is projected, from the backup memory 66 and transfers the optimum data to the memory 65.

If the correction data to be stored exceeds eight kinds, the correction data are successively overwritten from that stored first in the order of storage.

The D/A converter 67 converts the correction data read out from the backup memory 65 into an analog correction signal and supplies the analog correction signal to the filter 68.

The filter 68 smooths the analog correction signal into which the D/A converter 67 has converted the correction data and supplies the analog correction signal to the multipliers 71a, 71b, 71c as luminance correction signals.

The horizontal synchronizing frequency measuring unit 69 measures the frequency of the horizontal synchronizing signal $H_D$ supplied from the synchronizing signal separation unit 61 or the horizontal synchronizing signal input terminal $H_{Din}$ and supplies a measured result thereof to the CPU 70.

The CPU 70 controls the above circuits and units for executing their functions, and has an arithmetic means for, when the frequency of the input horizontal synchronizing signal $H_D$ is changed, calculating an optimum correction data for forming an optimum curve of the luminance level in response to the horizontal synchronizing signal $H_D$. The CPU 70 writes the calculated correction curve data in the memory 65.

The multipliers 71a, 71b, 71c respectively multiply the video signals R, G, B input from the video input terminals $R_{in}$, $G_{in}$, $B_{in}$ with the analog correction signal (i.e., the luminance correction signal) output from the filter 68, thereby setting the video signals R, G, B so as to have predetermined luminance levels. The multipliers 71a, 71b, 71c supplies the video signals R, G, B through buffer amplifiers 72a, 72b, 72c to the video output terminals $R_{out}$, $G_{out}$, $B_{out}$ and then to the projecting apparatus 40A, 40B, 40C shown in FIG. 3.

Figure 9:
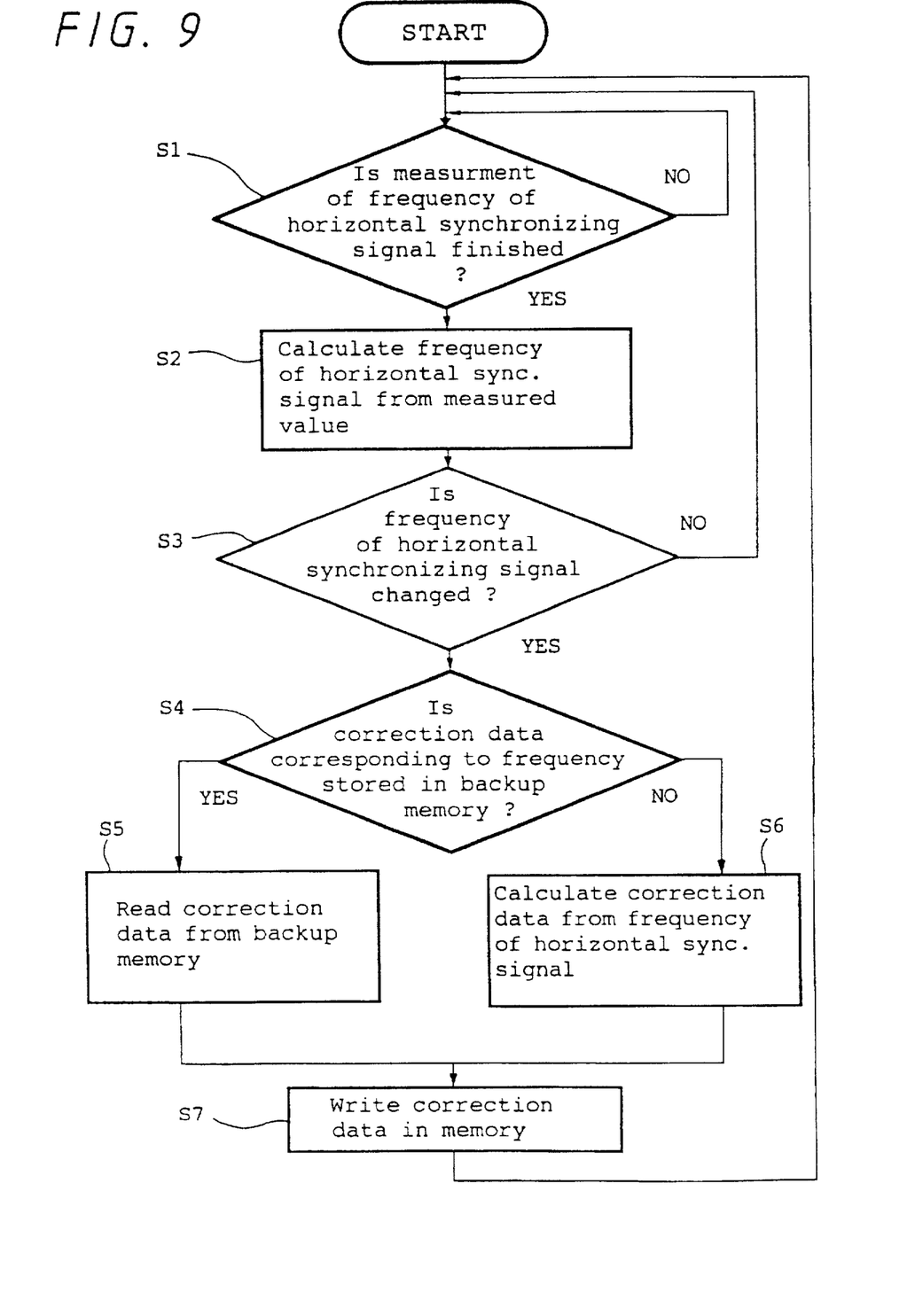
FIG. 9 is a flowchart used to explain a processing of writing a luminance correction data in a memory.

A processing of writing the correction data in the backup memory 65 will be described with reference to FIG. 9 which is a flowchart.

When being supplied with the horizontal synchronizing signal which has been superposed on the video signal G, supplied through the video input terminal $G_{in}$ to the synchronizing signal separation unit 61 and extracted thereby from the video signal G or the horizontal synchronizing signal input from the horizontal synchronizing signal input terminal $V_{Din}$, the horizontal frequency measuring unit 69 starts measuring the frequency of the supplied horizontal synchronizing signal in step S1. In step S1, it is determined whether or not the measurement of the frequency of the horizontal synchronizing signal is finished. If it is determined in step S1 that the measurement is not finished, then the horizontal synchronizing frequency measuring unit 69 measures the frequency until it obtains a measured value thereof. If it is determined in step S1 that the measurement is finished, then in step S2 the CPU 70 calculates the frequency of the input horizontal synchronizing signal based on the measured value. Then, the process proceeds to step S3. If it is determined in step S3 that the latest measured frequency of the horizontal synchronizing signal is not changed from a previously input frequency thereof, then the process returns to step S1, where the horizontal synchronizing frequency measuring unit 69 continues measuring the frequency. If it is determined in step S3 that the latest measured frequency of the horizontal synchronizing signal is changed from the previously input frequency thereof, then the process proceeds to step S4, where the CPU 70 determines whether or not the backup memory 66 stores the correction data corresponding to the frequency of the input horizontal synchronizing signal.

If it is determined in step S4 that the backup memory 66 stores the correction data corresponding to the frequency of the input horizontal synchronizing signal, then the CPU 70 reads out the correction data in step S5, and writes the correction data in the memory 65 in step S7.

If it is determined in step S4 that the backup memory 66 does not store the correction data corresponding to the frequency of the input horizontal synchronizing signal, then the process proceeds to step S6, where the CPU 70 calculates the correction data to be written in the memory 65, based on the presently input frequency of the horizontal synchronizing signal. Then, the process proceeds to step S7, where the CPU 70 writes the calculated correction data corresponding to the presently input horizontal synchronizing signal in the memory 65 to update the correction data.

After the correction data stored in the memory 65 is updated in step S7, the process returns to step S1, where the horizontal synchronizing frequency measuring unit 69 continues measuring the frequency of the input horizontal synchronizing signal.

Figure 6:
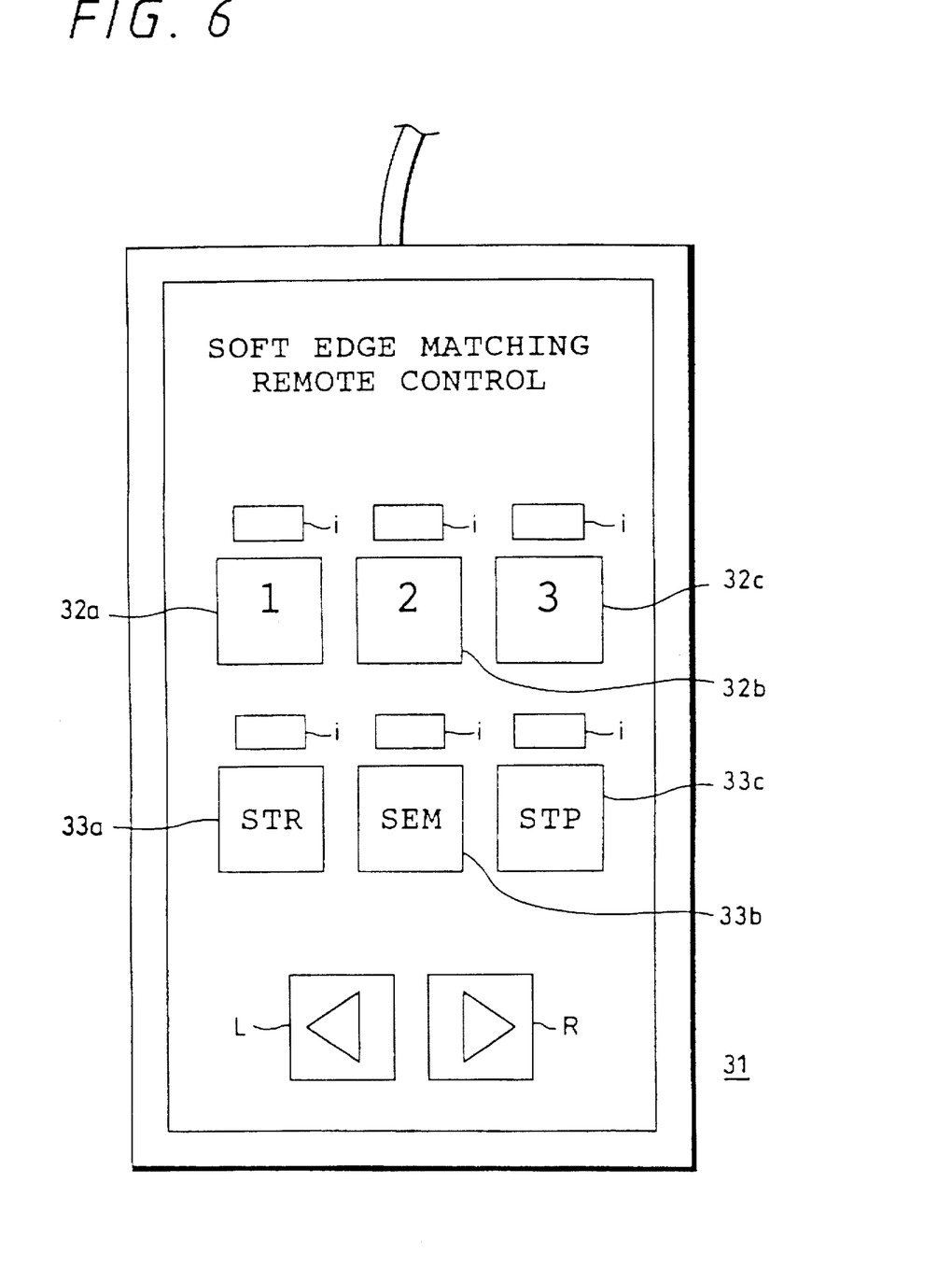
FIG. 6 is a diagram showing a remote controller unit of a soft edge matching (SEM) apparatus according to the embodiment.

The correction data written in the memory 65 is updated by operating the operation keys of the remote controller unit 31 shown in FIG. 6. Therefore, various kinds of adjustment can be carried out on a real time base, which leads to simplified and speedy adjustment.

As described with reference to the above flowchart, since the calculated correction data is once written in the memory 65 and read out with reference to the clock signal CLK with a fixed frequency supplied from the reference clock signal generating unit 62, it is sufficient that the filter 68 for smoothing the analog correction signal into which the D/A converter 67 has converted the correction data corresponds to a certain frequency.

As described above, according to the present invention, it is possible to calculate the correction data corresponding to the horizontal synchronizing frequency of the input video signal and write the calculated correction data in the memory 65, and it is possible to store in the backup memory 66 several kinds of correction data corresponding to the horizontal synchronizing frequencies of the video signals which have been input to the SEM apparatus 30. Therefore, when a plurality of video signal sources which are frequently used are switched for use, it is sufficient that the correction data corresponding to the video signal from the video signal source is read out from the backup memory 66 and used. It is unnecessary to calculate the correction data every time when the video signal is input.

Thus, when the synthesized picture is projected by using the video signal source 20 which is frequently used, it is possible to quickly carry out various adjustments for the SEM processing, which facilitates the projection of the synthesized picture on the screen 50.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A video signal processing apparatus comprising:

a synchronizing signal separation unit for extracting a synchronization information of an input video signal;

a frequency measuring unit for detecting a horizontal synchronizing frequency of said input video signal from said synchronization information;

a memory unit for storing a correction data used for correcting at least a video signal of one horizontal scanning line amount corresponding to said horizontal synchronizing frequency;

a backup memory unit for storing said correction data corresponding to said horizontal synchronizing frequency of said input video signal as backup data; and a correction data calculating unit for calculating said correction data corresponding to said horizontal synchronizing frequency, wherein, when said horizontal synchronizing frequency of said input video signal is changed, if said backup data corresponding to said horizontal synchronizing frequency is stored in said backup memory unit, then said correction data is read out from said backup memory unit and stored in said memory unit, and wherein if said backup data corresponding to said horizontal synchronizing frequency is not stored in said backup memory unit when the horizontal synchronizing frequency of the input video signal is changed, then said correction data calculated by said correction data calculating unit is stored in said memory unit and said backup memory unit.

2. The video signal processing apparatus according to claim 1, wherein said backup memory unit can store a plurality of correction data corresponding to a plurality of horizontal synchronizing frequencies.

3. A picture adjusting method for a synthesized picture projecting apparatus for projecting two pictures or more on a screen to form a synthesized picture, comprising the steps of:

reading out a correction data stored in a backup memory means to store the same in a correction memory means when a horizontal synchronizing frequency of an input video signal is changed, if said correction data corresponding to said horizontal synchronizing frequency is stored as a backup data in said backup memory means;

calculating said correction data corresponding to said horizontal synchronizing frequency to store said calculated correction data in said correction memory means and said backup memory means if said backup data corresponding to said changed horizontal synchronizing frequency is not stored in said backup memory means; and adjusting a picture in said synthesized picture projecting apparatus based on said correction data stored in said correction memory means.

* * * * *